United States Patent
Stoehr et al.

(10) Patent No.: US 7,322,215 B2
(45) Date of Patent: Jan. 29, 2008

(54) METHOD FOR BLANK PRESSING OF OPTICAL COMPONENTS

(75) Inventors: Ulrike Stoehr, Mainz-Finthen (DE); Ralf Biertuempfel, Mainz-Kastel (DE); Wolfgang Semar, Mainz-Hechtsheim (DE)

(73) Assignee: Schott AG, Mainz (DE)

( * ) Notice: Subject to any disclaimer, the term of this patent is extended or adjusted under 35 U.S.C. 154(b) by 408 days.

(21) Appl. No.: 10/625,574

(22) Filed: Jul. 23, 2003

(65) Prior Publication Data

US 2004/0123628 A1 Jul. 1, 2004

(30) Foreign Application Priority Data

Jul. 27, 2002 (DE) ................ 102 34 234

(51) Int. Cl.
*C03B 21/00* (2006.01)

(52) U.S. Cl. ............................. 65/102; 65/111; 65/168; 65/356; 65/62

(58) Field of Classification Search .................. 65/102, 65/111, 168, 169, 170, 29, 18, 356, 275, 25.4, 65/24, 25.2, 62, 181, 375
See application file for complete search history.

(56) References Cited

U.S. PATENT DOCUMENTS 5,987,922 A 11/1999 Hirota et al.
6,279,346 B1 * 8/2001 Ribes et al. ................ 65/25.4

FOREIGN PATENT DOCUMENTS

GB 2 234 970 A 2/1991
JP 22 52629 10/1990

* cited by examiner

*Primary Examiner*—Mark Halpern
(74) *Attorney, Agent, or Firm*—Michael J. Striker

(57) ABSTRACT

Methods for press molding a glass body, especially for optical applications, without additional grinding and polishing steps are described. One method is performed with a press mold having an upper mold part, a lower mold part and, if necessary or desired, a ring. In order to improve the quality of the products, especially glass bodies of larger diameters, a voltage is applied across the upper mold part and the lower mold part when the glass body is within the press mold and a pressing force is applied to the glass body when the temperature of the glass body matches the temperature of the press mold. Alternatively, in another method the press mold is cooled after it reaches a predetermined temperature and the pressing force is applied to the glass body in the mold after exceeding the sticking temperature ($T_o$).

6 Claims, 5 Drawing Sheets

METHOD FOR BLANK PRESSING OF OPTICAL COMPONENTS

BACKGROUND OF THE INVENTION

1. Field of the Invention

The present invention relates to a method for blank pressing a glass body, especially for an optical application, using a press mold comprising an upper mold part and a lower mold part and/or a ring, this press mold receiving the glass body heated above a shaping temperature. It also relates to an apparatus for performing this method.

The term "blank pressing" means pressing a glass body having optically active surfaces, so that these surfaces do not need to be worked further. Polishing and grinding steps are eliminated for these surfaces.

2. Description of the Related Art

JP 225 26 29 describes methods of this type, in which the glass body is processed in a two-step pressing process and the already shaped glass body is cooled during the pressing process. In a preferred embodiment a cylindrical perform is placed between the upper and lower dies, heated and subsequently shaped by pressing. After finishing the first molding or shaping process the pressing force is temporarily completely or partially reduced and then applied again during the cooling down below the glass transition temperature $T_G$.

U.S. Pat. No. 5,987,922 discloses a manufacturing method for a melted glass body, which is useable in optical equipment, for example as a lens. In this known method first an initial pressing force is applied to the viscous glass body, which is superimposed by an intermediate pressure after a time interval of, for example, 5 to 20 seconds. The intermediate pressure decreases with decreasing glass temperature.

The essential disadvantage of the currently known methods is that blank-pressed optical components, especially with large diameters, cannot be efficiently made with the required quality.

SUMMARY OF THE INVENTION

It is an object of the present invention to provide a method of press molding a glass body, especially a glass body with a larger diameter, with which the glass body is made economically with an optimum optical quality.

It is another object of the present invention to provide an apparatus for press molding a glass body, which performs the method according to the invention.

This object and others, which will be made more apparent hereinafter, is attained in a first method comprising the steps of providing a press mold comprising an upper mold part, a lower mold part and, optionally, a ring, and receiving a glass body heated above a shaping temperature in the press mold.

According to the invention a voltage is applied across the upper mold part and the lower mold part for working the glass body at temperatures above a sticking temperature and a pressing force is applied to the glass body at the latest after a temperature of the glass body in the press mold matches a temperature of the press mold.

The manufacturing process currently used for press molding a glass body is limited by the sticking temperature $T_0$, at which the glass body adheres to the press mold. By applying a voltage across the glass body in the press mold it is possible now to work the glass body above the sticking temperature $T_0$. Thus the glass body can be brought to a higher temperature level and thus a lower viscosity at the beginning of the process, i.e. during heat up in the press mold. This leads to a shorter dwell time of the glass body in the press mold. The method can then be performed more rapidly and thus the manufacturing costs can be reduced.

An additional aspect of the method according to the invention is the influence of the adherence behavior, whereby the glass can be pressed at higher temperature, and thus at a lower viscosity, than currently possible. Because of that, an improved optical quality has been obtained, which has not been possible up to now, even at larger glass body diameters.

An additional substantial advantage is that an improved shaping and/or structuring of the glass body by the press mold are possible by adjusting the wetting behavior. Because of that smaller deviations of less than 100 nm, even with glass bodies having diameters of greater than 40 mm, are obtained.

Furthermore a larger processing window is possible, i.e. for example a higher press mold or glass temperature, an extended contact time between the press mold and glass body or a higher pressing force. Because of the smaller viscosity during pressing stress and strain in the glass can relax better, which improves the optical properties of the finished pressed glass body.

An additional advantage is that expensive coating of the press mold need not be provided or inexpensive coating and press mold materials can be used.

In a second alternative method according to the invention the press mold is cooled after reaching a predetermined temperature of the press mold and a pressing force is applied to the glass body after exceeding a sticking temperature.

In preferred embodiments of this second method both the glass body and the press mold are heated to a very high temperature, at which they, as long as no pressing force is applied, still do not adhere to each other. However if a pressing force is applied to the glass body at this time, the glass body and the press mold would stick together. For this reason the press mold, which has a good thermal conductivity, is so rapidly cooled, immediately prior to beginning pressing, that the glass body and the press mold should no longer stick together when a pressing force is applied. Thus the glass, which has a poor thermal conductivity, cools only slightly, so that this second method, in contrast to the methods known in the prior art, has the advantages discussed in relation to the first method according to the invention. The essential aspect of this second method is the comparatively high temperature of the glass body, also the correspondingly low viscosity, which permits a very exact shaping of the contour and/or structuring of the glass body by the press mold.

In particularly preferred embodiments of the second method according to the invention a voltage is applied across the upper mold part and the lower mold part. The sticking temperature $T_0$ is raised still further by application of the voltage so that the advantages described in connection with the first and second methods are especially present in this combination of the features of both the first and the second methods.

The applied voltage can beneficially be a D.C. voltage. However an asymmetrical alternating voltage can also be used as the applied voltage.

Preferably the pressing force can be kept constant or reduced when the temperature of the press mold is reduced. Strains in the glass can be favorably influenced by planned reductions of the pressing force and the glass temperature, in order to improve the quality of the glass body.

In a special embodiment of the method the glass body is heated in the press mold. This prevents difficulties and formating regarding adjustments in the glass batch in the mold during transport to the mold from an external heating station.

The apparatus according to the invention for performing the first method is provided with means for applying a voltage comprising a cable and a voltage source, which is connected by the cable to an upper mold part and a lower mold part, and with means for applying a pressing force to the glass body within the press mold.

The apparatus according to the invention for performing the second method is equipped with cooling elements for cooling the press mold and also with means for applying a pressing force to the glass body in the mold.

Preferably the press mold is connected by a cable with the voltage source, which is a D.C. voltage or function generator.

In an advantageous embodiment of the apparatus the press mold is provided with different coated regions. The different coated regions, for example, can be regions of different electrical conductivity. This permits a selective influencing of the electrochemical conversion processes in different regions of the glass body. Thus the adherence properties between the glass body and the press mold can be influenced and thus the formation of the glass body surfaces and glass body shape can be controlled.

Preferably a heat source is arranged in or on the press mold. This permits heating the glass body within the press mold and an accurate tempering of the press mold during the pressing process.

BRIEF DESCRIPTION OF THE SEVERAL VIEWS OF THE DRAWING

The objects, features and advantages of the invention will now be illustrated in more detail with the aid of the following description of the preferred embodiments, with reference to the accompanying figures in which.

DETAILED DESCRIPTION OF THE INVENTION

Figure 1:
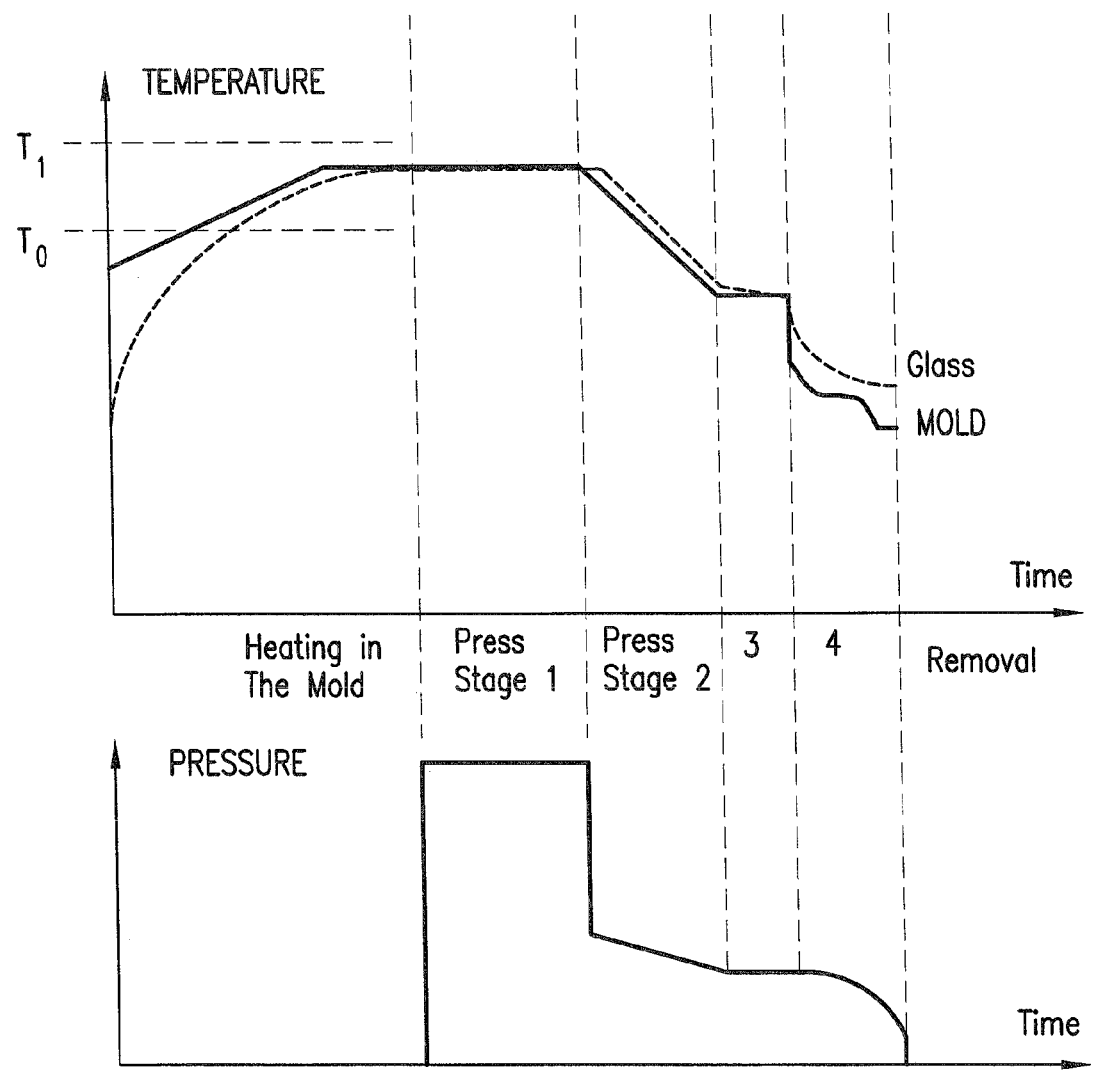
FIG. 1 is a graphical illustration of the behavior of temperatures of the glass body and the press mold as well as of the pressure applied to glass body in the mold during application of a voltage according to a first method of the invention.

FIG. 1 is a graph showing the dependence of temperatures of the glass body and the press mold on time, during application of an electrical potential according to a first method according to the invention. The lower curve shows the dependence of the applied pressure on time also during application of the electrical potential.

At the start of the method first the mold is continuously heated above the sticking temperature $T_0$ up to a maximum temperature $T_1$, which lies above the sticking temperature $T_0$. This is possible without adherence of the glass body to the press mold only by application of the electrical potential or voltage across the glass body in the press mold. In this stage of the method the temperature of the glass body approaches the temperature of the press mold. After the glass body and the press mold achieve a common temperature the maximum pressure is applied to the glass body during the time interval "press stage 1" shown e.g. on FIG. 1. The temperature of the press mold and the glass body remains essentially constant until the start of the time interval "press stage 2".

In the stage "press stage 2" the applied pressure and the temperature of the press mold are simultaneously reduced. As shown in FIG. 1, the glass temperature generally approaches the temperature of the press mold. This happens considerably more rapidly than in the heating stage, since the glass body is under an applied pressure in the press mold, which improves the heat transmission. During the "press stage 2" the pressure applied to the glass body continuously decreases.

During the next stage "press stage 3" (labeled with only a "3" in the figures) pressure applied to the glass body and the temperatures of the glass body and the press mold are constant.

In the final stage prior to removal of the glass body, "press stage 4" (labeled only with a "4" in the drawing) the temperature of the press mold is first considerably lowered and subsequently drops in a short time interval. Also the applied pressure is similarly reduced. Because of the lower pressure the heat transmission from the glass body to the press mold is poorer, so that the temperature of the glass body approaches the temperature of the press mold more slowly than in the stage "press stage 2".

Figure 2:
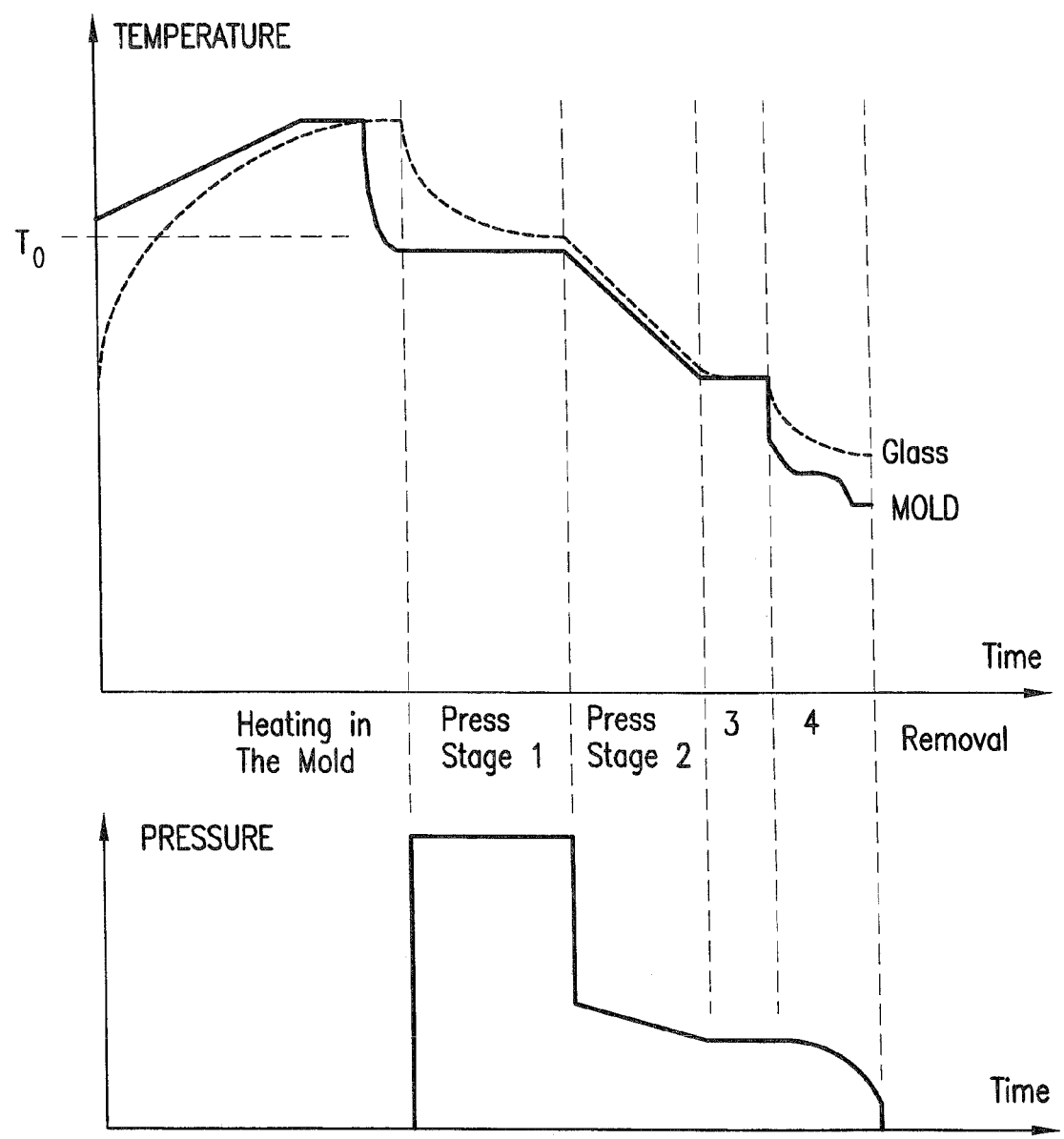
FIG. 2 is a graphical illustration of the behavior of temperatures of the glass body and the press mold as well as of the pressure applied to the glass body in the mold during cooling of the mold and during application of a voltage according to a second method of the invention.

In FIG. 2 the second method, in which the mold is rapidly cooled to below the sticking temperature prior to application of the applied pressure on the glass body, is illustrated in more detail. This occurs immediately after a heating stage, which is similar to the heating stage shown in FIG. 1. Next after the rapid cooling of the mold until the temperature is below the sticking temperature $T_0$ pressure is applied in the stage "press stage 1". This results in a comparatively rapid reduction of the temperature of the glass body by improved contact of the glass body and the press mold under the elevated pressure, which results in improved heat transfer.

At the beginning of a further stage, namely "press stage 2" the applied pressure is considerably reduced and the temperature of the press mold and the glass body drops. In a third stage "press stage 3" the temperature of the press mold and the pressure applied to the glass body are largely kept constant.

The behavior of temperature and pressure in the final stage "press stage 4" in FIG. 2 corresponds to that in the method shown in FIG. 1, like "press stage 2" and "press stage 3" as already described above.

Figure 3:
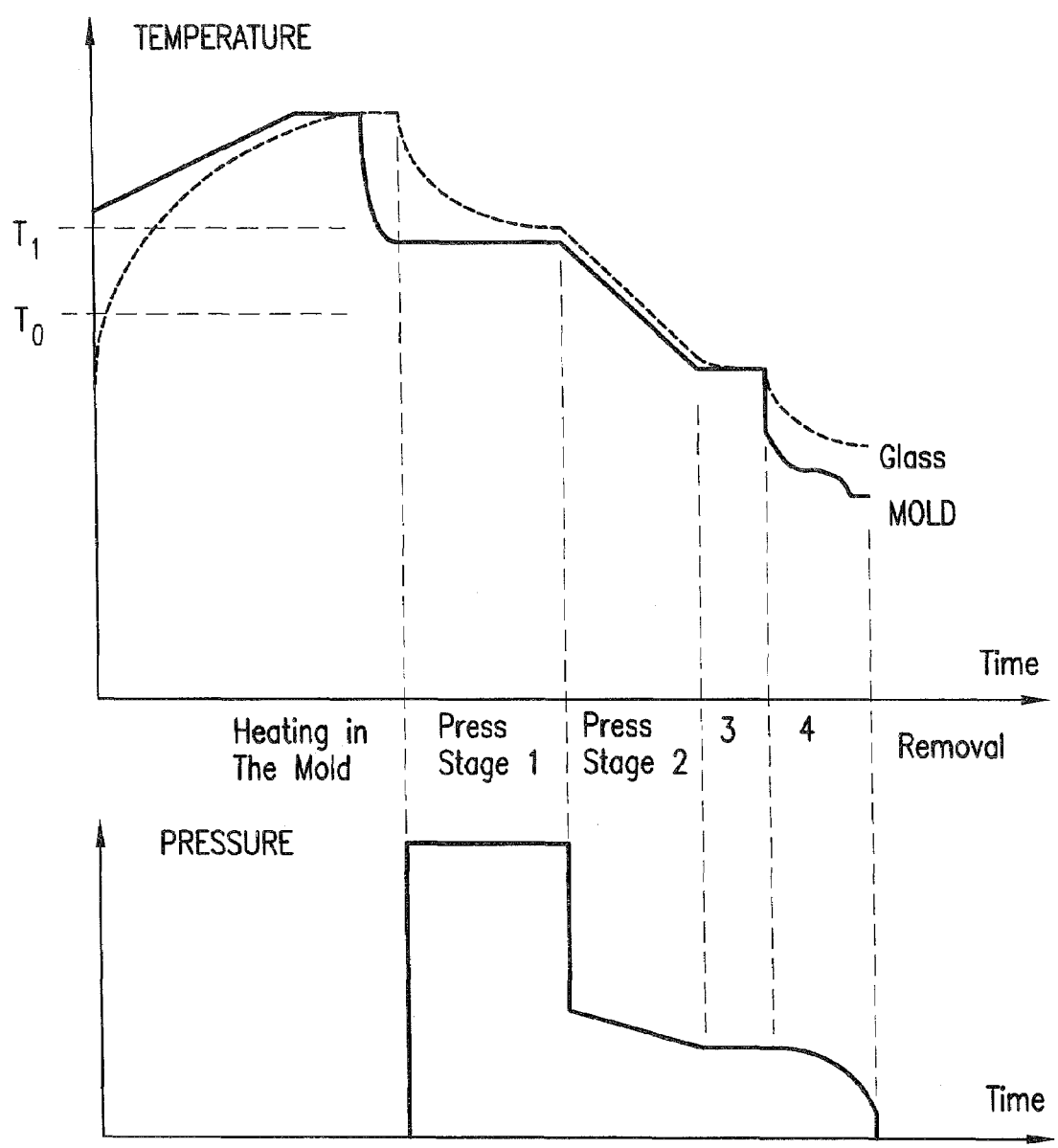
FIG. 3 is a graphical illustration of the behavior of temperatures of the glass body and the press mold as well as of the pressure applied to the glass body in the press mold during application of a voltage and during cooling of the press mold according to a combination of the first and second methods of the invention.

In FIG. 3 the behavior of the temperature of the glass body and the press mold and the associated applied pressure during application of an electrical potential across the glass body in the press mold and at the same time during cooling of the press mold prior to application of applied pressure is illustrated.

In the heat up stage first the glass body is heated to a temperature level, which is above the temperature used in methods in which only an electrical potential is applied or in methods in which only rapid cooling of the press mold takes place prior to application of the applied pressure. The additional method behavior corresponds qualitatively to that already described in connection with FIG. 2, however at a generally higher temperature level. The stage "press stage 1" begins at the maximum temperature of the glass body while the temperature of the press mold has already dropped to the final temperature level for this stage. By building the applied pressure up the temperature of the glass body now more rapidly matches the temperature of the press mold. The nearly common temperature level of the glass body and the press mold is also clearly above the sticking temperature $T_0$ at the end of the stage "press stage 1".

Subsequent stages of the method shown in FIG. 3, especially the course of the applied pressure, correspond to the similar stages described in connection with FIGS. 1 and 2.

Figure 4:
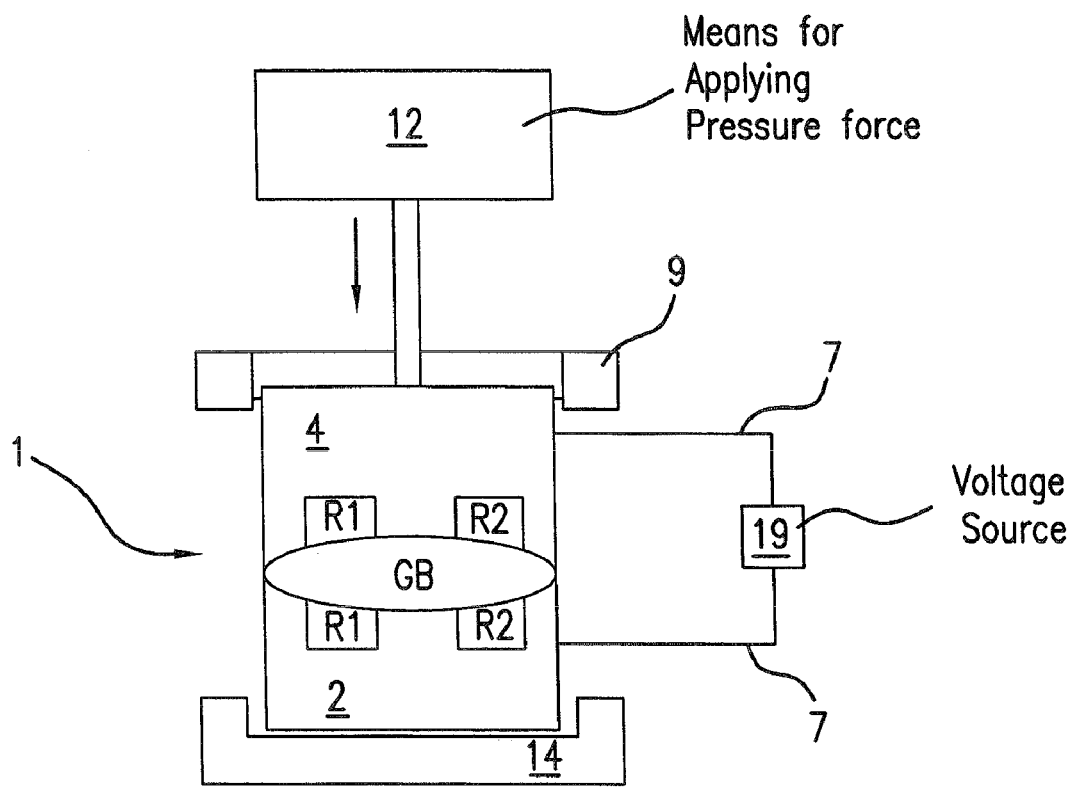
FIG. 4 is a schematic cross-sectional view through an apparatus according to the invention for performing a preferred embodiment of the first method for blank pressing of a glass body according to the invention.

FIG. 4 shows a first apparatus for performing a preferred embodiment of the first method according to the invention for blank pressing or press molding a glass body according to the invention. The press mold 1 has an upper mold part 4 and a lower mold part 2 and the glass body GB is shown in FIG. 4 between the upper mold part and the lower mold part. The optional ring 9 is shown, but the housing with its supporting parts, which are arranged around the upper mold part 4, the lower mold part 2 and the ring 9, is omitted for simplicity.

Means 12 for applying pressing force to the upper mold part 4 is shown in FIG. 4. This means could, for example, be a piston-cylinder unit.

In preferred embodiments of the apparatus, as shown in FIG. 4, a heater 14 is provided to heat the press mold 1. Also the surfaces of the upper and lower mold parts 2,4 are provided with regions R1, R2 of different electrical conductivity to influence the surface properties of the resulting glass body.

In the first apparatus shown in FIG. 4 means for applying an electrical potential or voltage across the glass body GB are provided to permit working or shaping at higher temperatures. The means for applying a voltage comprises a voltage source 19 and a cable 7 connecting the voltage source 19 across the upper mold part 2 and the lower mold part 4. The voltage source 19 can be a D.C. voltage source or a function generator.

Figure 5:
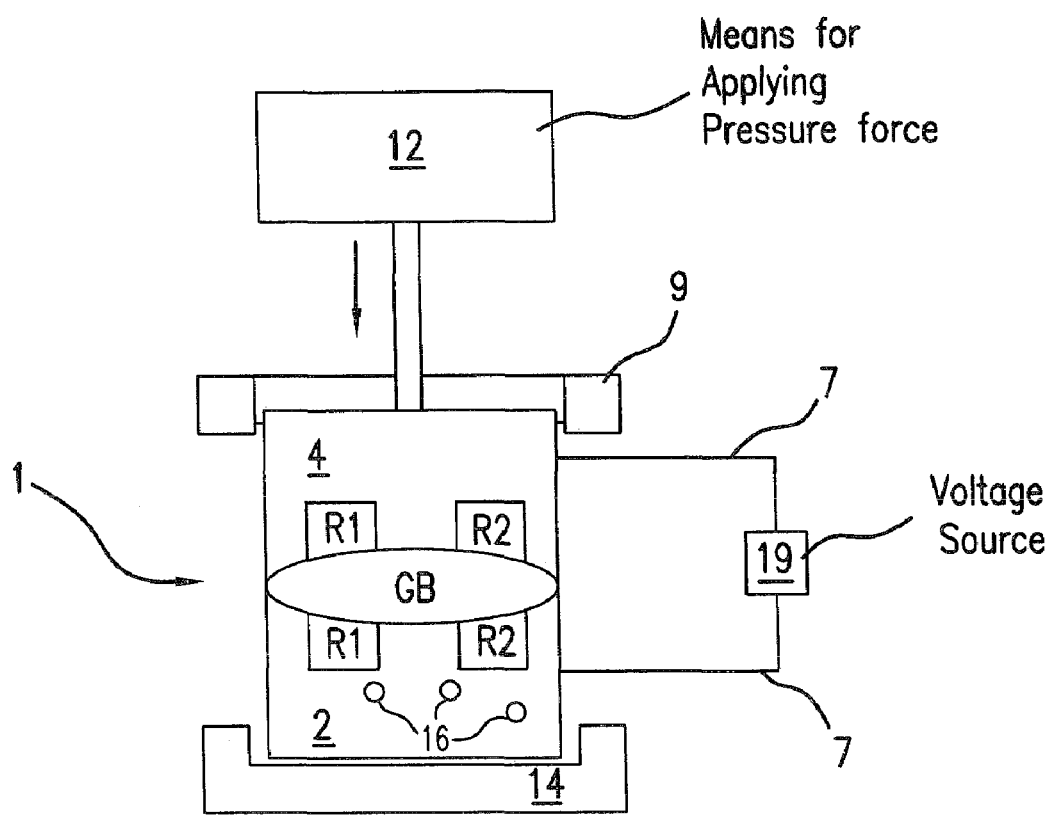
FIG. 5 is a schematic cross-sectional view through another apparatus according to the invention for performing a preferred embodiment of the second method for blank pressing of a glass body according to the invention.

FIG. 5 shows a preferred embodiment of a second apparatus for performing the second method according to the invention for blank pressing the glass body. The same parts as in the apparatus of FIG. 4 are provided with the same reference number and are not discussed further in connection with the embodiment of FIG. 5.

The embodiment of FIG. 5 is however provided with cooling elements 16 for cooling the press mold 1.

The disclosure in German Patent Application 102 34 234.2-45 of Jul. 27, 2002 is incorporated here by reference. This German Patent Application describes the invention described hereinabove and claimed in the claims appended hereinbelow and provides the basis for a claim of priority for the instant invention under 35 U.S.C. 119.

While the invention has been illustrated and described as embodied in a method of blank pressing optical components, it is not intended to be limited to the details shown, since various modifications and changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and is set forth in the following appended claims.

We claim:

1. A method of precision pressing a glass body to form an optical component of high quality, said method consisting of the steps of:

a) providing a press mold comprising an upper mold part, a lower mold part and, optionally, a ring;

b) receiving a glass body in the press mold so that the glass body is between the upper mold part and the lower mold part;

c) applying a voltage across the glass body received in the press mold in step b);

d) during the applying of the voltage across the glass body in step c), heating the press mold continuously to a press mold temperature above a sticking temperature ($T_0$) and until a glass body temperature of said glass body reaches said press mold temperature, wherein said sticking temperature ($T_0$) is the glass body temperature at which the glass body would adhere to the press mold if said voltage were not applied across the glass body during step c);

e) after said glass body temperature reaches said press mold temperature above the sticking temperature ($T_0$) and during the applying of the voltage across the glass body, in a first press stage maintaining said press mold temperature constant and at the same time applying a pressure to said glass body and maintaining said pressure at a constant maximum value during said first press stage;

f) in a second press stage following said first press stage simultaneously continuously decreasing said pressure applied to said glass body and reducing said press mold temperature;

g) in a third press stage following said second press stage maintaining said pressure applied to said glass body constant at a pressure value reached at an end of said second press stage and maintaining said press mold temperature constant at a temperature value reached at an end of said second press stage;

h) in a fourth press stage following said third press stage simultaneously lowering said press mold temperature and lowering said pressure applied to said glass body; and then i) removing the glass body from said press mold to thus obtain the optical component, wherein said optical component has deviations from predetermined dimensions that are smaller than 100 nm.

2. The method as defined in claim 1, wherein said voltage is a D.C. voltage.

3. The method as defined in claim 1, wherein said voltage comprises an A.C. voltage.

4. A method of precision pressing a glass body to form an optical component of high quality, said method consisting of the steps of:
   a) providing a press mold comprising an upper mold part, a lower mold part and, optionally, a ring;
   b) receiving a glass body in the press mold so that the glass body is between the upper mold part and the lower mold part;
   c) applying a voltage across the glass body received in the press mold in step b);
   d) during the applying of the voltage across the glass body in step c), heating the press mold continuously to a press mold temperature above a sticking temperature ($T_0$) and until a glass body temperature of said glass body reaches said press mold temperature, wherein said sticking temperature ($T_0$) is the glass body temperature at which the glass body would adhere to the press mold if said voltage were not applied across the glass body during step c);
   e) after said glass body temperature reaches said press mold temperature above the sticking temperature ($T_0$) and during the applying of the voltage across the glass body, in a first press stage maintaining said press mold temperature constant and at the same time applying a pressure to said glass body and maintaining said pressure at a constant maximum value during said first press stage;
   f) in a second press stage following said first press stage simultaneously continuously decreasing said pressure applied to said glass body and reducing said press mold temperature;
   g) in a third press stage following said second press stage maintaining said pressure applied to said glass body constant at a pressure value reached at an end of said second press stage and maintaining said press mold temperature constant at a temperature value reached at an end of said second press stage;
   h) in a fourth press stage following said third press stage simultaneously lowering said press mold temperature and lowering said pressure applied to said glass body;
   i) removing the glass body from said press mold to thus obtain the optical component, wherein said optical component has deviations from predetermined dimensions that are smaller than 100 nm, and after said glass body temperature reaches said press mold temperature above the sticking temperature ($T_0$) and during the applying of the voltage across the glass body, rapidly cooling the press mold to reduce said press mold temperature.

5. The method as defined in claim 4, wherein said voltage is a D.C. voltage.

6. The method as defined in claim 4, wherein said voltage comprises an alternating voltage.

* * * * *